March 3, 1959 D. C. BARTON 2,876,113
PACKAGING DEVICE FOR MERCHANDISING FOOD CONCENTRATES
Filed Aug. 13, 1956
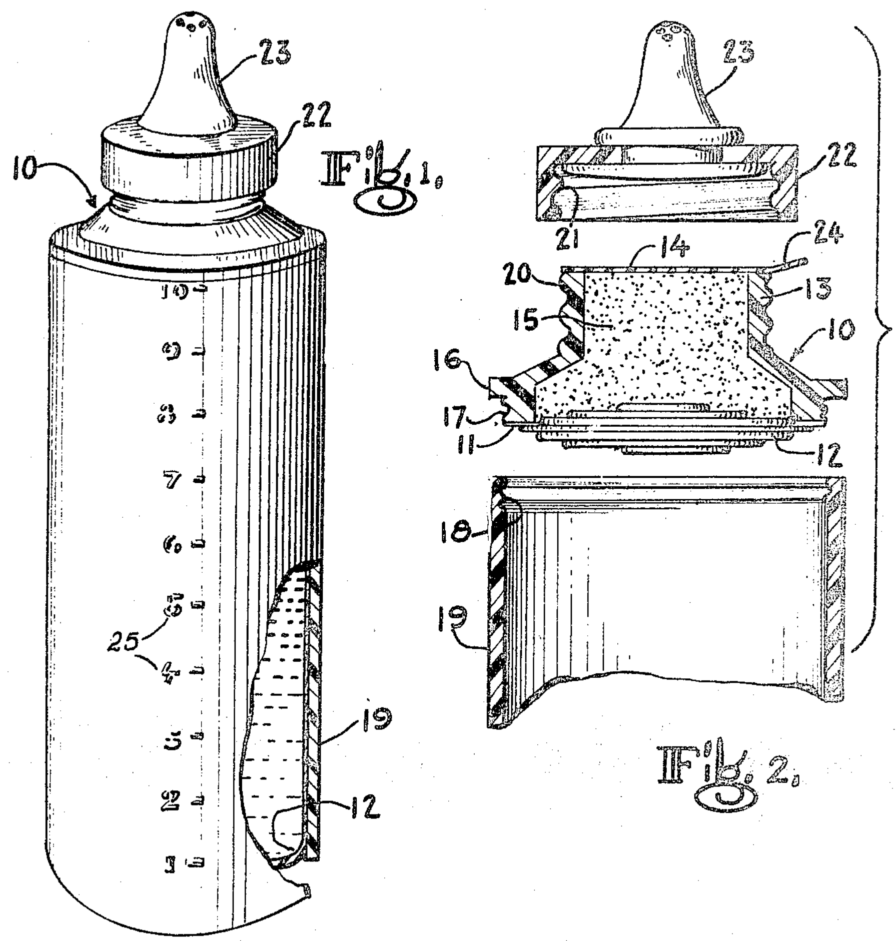
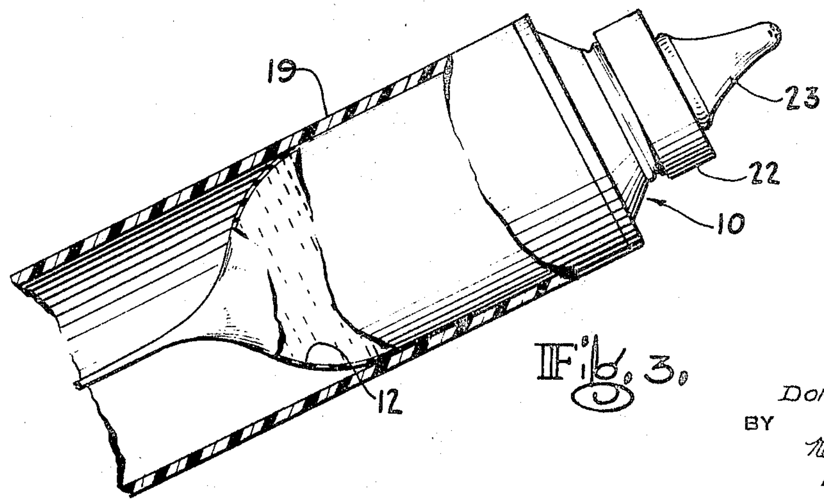
INVENTOR
DONN C. BARTON
BY
Kenyon & Kenyon
ATTORNEY United States Patent Office 2,876,113

Patented Mar. 3, 1959

1

2,876,113

PACKAGING DEVICE FOR MERCHANDISING FOOD CONCENTRATES

Donn C. Barton, Portland, Conn.

Application August 13, 1956, Serial No. 603,748

5 Claims. (Cl. 99—171)

This invention relates to packaging device and methods for merchandising food concentrates.

It is an object of this invention to provide a lightweight, inexpensive, disposable, single-service container for one-time machine filling with concentrated food in either dry, paste or liquid condition which is sealable after loading at the processing plant and is adapted for use as a direct dispenser for the food after dilution of the concentrate with a diluent liquid such as water or milk.

While this invention is applicable for other purposes, it is of particular applicability and utility in infant feeding.

In feeding infants milk formulas and other fluids considerable handling and preparation of materials under aseptic conditions are needed. For new mothers or in families where considerable care must be devoted to other children formula preparation is a difficult problem and one with which most mothers would be happy to dispense. In typical infant formula preparation cow's milk is boiled and diluted, or concentrated or dried milk is diluted to the proper strength in sterile vessels and the formula after having thus been prepared is measured into sterile bottles. Alternatively, the diluted formula prior to sterilization is divided into the proper number of bottles and the formula in the bottles is then sterilized for a suitable length of time, which is usually of the order of twenty minutes. Such formula preparation requires considerable effort and specialized equipment and there is always the danger of contamination by pathogenic bacteria, which contamination cannot be discovered until the baby becomes ill. While proposals have been made to overcome these disadvantages using bottles prefilled with prepared liquid formula, using folding plastic bottles with nipples already attached and the like, these methods have not found wide use because of the expense involved and, in some cases, the transportation and storage problems created.

Further principal objects of this invention are, therefore, to provide a packaging device and method for use in infant feeding which is easy, foolproof and cheap. More particular objects in this connection are to provide a factory prefilled disposable nursing bottle which is particularly adapted for easy sterile preparation of a baby's formula, the characteristics of the nursing bottle being such as to comprise and provide a packaging unit capable of storage in a compact space without refrigeration so that the packaged food concentrate may be merchandised through customary retail store outlets.

Further objects of this invention are to provide a package device or container which eliminates haphazard tedious home compounding of infant food and which, by virtue of its low cost and adaptability to quantity production and loading, will permit large processing plants to engage in the manufacture of prepackaged concentrated infant food. In like manner, the packaging device of this invention enables the loading of units of packaged concentrated food into cartons suitable for providing a supply for long-term home feeding. Or, alternatively, smaller cartons of the packaged units of concentrated food may be supplied for short-term feeding, as while traveling. The packaging device and method of this invention is admirably suited for infant feeding during traveling.

Features of this invention relate to the provision of a light, inexpensive, disposable, single-service shipping container in the form of a neck member having a larger end and a smaller end. As initially made up for use at the processing plant for packaging the food concentrate, the larger end of the neck is closed off by a collapsible bag disposed in adjacent relation to and over the larger end of the neck member so that when the neck member is in upright position the collapsed bag provides an impervious bottom of a container whose side walls are provided by the neck member. The neck member is preferably made of an inexpensive molded plastic and is of such overall dimensions that when the collapsible bag is in collapsed position at the larger end of the neck member, the neck member will hold a quantity of concentrated food suitable for a single feeding. The smaller end of the neck member is closed off after the neck member has been filled with the desired quantity of food concentrate and the closure for this purpose is adapted to provide a seal which seals the contents in sterile condition suitable for storage without refrigeration. This closure is, however, removable so that diluent liquid such as water or milk may be added, whereupon the collapsed bag becomes extended and provides a container for the diluted concentrate. For infant feeding the smaller end of the neck member is adapted either for the direct securement of a feeding nipple thereto or for the securement thereto of a top member to which the feeding nipple may be attached.

Further features of this invention relate to the provision of a tube which is so dimensioned that it is adapted for engagement to and disengagement from the larger end of the neck member, the larger end of the neck member and at least one end of the tube being provided with coacting elements such as screw threads to permit the ready attachment and removal of the tube from the larger end of the neck member. The length of the tube is appropriate for providing a protection for the collapsible bag when it is in extended position. The neck member having the collapsed bag closing off and sealing the larger end and a suitable closure sealing off the smaller end provides the disposable package unit adapted to be prefilled and sealed in sterile condition at a processing plant.

Further objects, features and advantages of this invention will become apparent from the typical embodiment of this invention which has been shown for purposes of illustration in the accompanying drawings, wherein:

Fig. 1 is a perspective view of the packaging device of this invention with a part thereof in section showing the collapsible bag in extended position and protected by the protecting tube which is attached to the larger end of the neck member;

Fig. 2 is a sectional elevation of the essential parts of the packaging device showing the neck member closed off at its larger end by the collapsible bag in collapsed position and sealed at its smaller end by a suitable sealing closure; and Fig. 3 is an elevation of the packaging device in inclined position and with part of the protecting tube broken away to show the collapsible bag in only partially filled condition, as when the contents have been partially consumed by an infant.

The neck member, which is indicated generally by the reference character 10, may be made of any suitable material and preferably is made of any one of a number of relatively inexpensive well-known plastic materials. Ordinarily the neck member is rigid but it may be made of semi-rigid material so long as it has shape-retaining and strain-resisting characteristics suitable for handling, shipment and use.

At the larger end 11 of the neck there is permanently secured the collapsible bag 12. In Fig. 2 this bag is shown with the material thereof collapsed on itself so as to be disposed in immediately adjacent relation to the larger end 11 of the neck member. The collapsible bag 12 may be made of any suitable pliant material such as waterproof "Cellophane" (cellulose film) or a thin film of polyethylene, the material being resistant to water and to milk in the case of a milk formula for infant feeding. It may be attached to the larger end of the neck member either adhesively or mechanically and for shipment and storage uses the attachment should provide a fluid-tight seal.

The smaller end 13 of the neck member 10 is closed off by the removable closure 14 which is adapted to be sealed to the smaller end of the neck member either adhesively or mechanically. The neck member 10 having the collapsed bag 12 closing off the larger end and the closure 14 closing off the smaller end provides a hollow package or container for the food concentrate 15. The overall dimensions may be any desired, and for infant feeding, for example, the amount of food concentrate in the neck member is suitable for a single feeding of an infant. The collapsed bag 12 and the closure 14 seal in the food concentrate 15 in sterile condition so that the neck member in the form shown in Fig. 2 and prefilled at the factory may be packed in suitable cartons for retail distribution.

The larger end of the neck member 10 is provided with the flange 16 and with the external threads 17 which are adapted to coact with the internal threads 18 at the end of the protecting tube 19 so that the protecting tube 19 may be readily attached to and detached from the larger end of the neck member. The tube 19 has approximately the same dimensions as the larger end of the neck member 10 and, as shown in Fig. 1, is ordinarily approximately the same in length as the bag 12 when the bag 12 is in extended position. The tube 19, therefore, provides a protection for the bag 12 when the bag 12 is in extended position.

The smaller end of the neck member 10 is adapted for the attachment and detachment of a feeding nipple. While the feeding nipple may be attached directly to the smaller end, the package device of this invention has been shown in the drawings with the smaller end of the neck member 10 externally threaded at 20 as to coact with the internal threads 21 of the cap 22 to which the nipple 23 is attached. Caps such as the cap 22 are widely used and cap 22 may be attached to the smaller end 13 of the neck member when the nipple is either outwardly directed as shown in the drawings or is inwardly directed for temporary storage after the food concentrate has been diluted and the formula has been readied for administration except for warming. Of course, the closure 14 for the smaller end of the neck member is removed before the cap 22 is attached to the neck member. To facilitate such removal, the closure 14 may have an ear 24 protruding from one side so that it may be readily grasped and pulled away from the smaller end of the neck member.

The manner of use of the packaging device of this invention and of practicing the method of this invention are apparent from the foregoing description. Thus the neck member, to the larger end of which the collapsible bag has been secured, is filled with a food concentrate such as a dried milk formula, and the smaller end then is hygienically sealed at the factory by the closure 14. The filled neck members provide disposable units that can be merchandised in retail store outlets. The purchaser of the units would have on hand conventional feeding nipples either with or without an adapter cap, as well as a few of the protecting tubes 19 according to the number of feedings which it may be convenient or desirable to prepare at one time. Each unit provided by a neck member may be attached to the end of one of the protecting tubes 19 and all that is required to prepare the formula in aseptic condition is the removal of the closure 14 and the addition of diluent liquid such as water which has been sterilized by boiling. Upon adding the diluent liquid the collapsible bag extends down into the protecting tube 19, as shown in Fig. 1. If, for example, six feedings are prepared in this way, the feedings after having been prepared may be placed in the refrigerator and the smaller end of the neck may be closed off in any conventional manner, as by turning the nipple upside down in the cap and attaching the cap to the smaller end of the bottle. For traveling, the feedings can be prepared one at a time, for nothing is required in the preparation of a formula under aseptic conditions other than the addition of a suitably sterilized diluent liquid.

A principal advantage of the packaging device and method of this invention resides in the convenience with which infant feedings may be prepared without the time, effort and specialized equipment conventionally required. Thus according to this invention it is possible to eliminate the laborious and time-consuming methods of resterilizing bottles, holders, accessories, spoons and utensils as well as sterilizing the formula ingredients themselves. By utilizing this invention the only duties of a parent in preparing an infant feeding reside in opening the neck member, adding a desired amount of diluent liquid and securing a previously sterilized conventional nipple. For convenience in use, the protecting tube 19 preferably is made of a transparent or translucent material so that the contents of the collapsible bag 12 may be observed through the wall of the protecting tube. This is advantageous both in adding diluent liquid and in observing the amount of liquid contents as the contents are consumed by an infant during feeding. So that the desired amount of diluent liquid may be more readily determined, the protecting tube 19 may have graduations 25 indicated thereon. The protecting tube ordinarily is made of rigid material but may also be made of a semi-rigid material provided that it has suitable shape-retaining and strain-resisting characteristics.

Other advantages result from the fact that danger of improper sterilization is minimized. Merely by following simple instructions, either one or several formula bottles may be readily prepared without the possibility of contamination. Moreover, the possibility of loss of food value or protein content due to overcooking is prevented since the formula may be prepared without cooking and merely by the addition of a diluent.

Another advantage of this invention resides in the fact that greater uniformity of formula preparation is made possible since accurate factory filling techniques may be employed. Under conventional formula preparation conditions it is necessary to remember rather complicated directions. Moreover, the length of boiling time will vary directly with the concentration and inversely with the amount of resulting formula, and formulas measured before sterilization are no guide to final volume in concentration. Factors such as these contribute to non-uniformity under conventional formula preparation conditions.

It is also an advantage of this invention that it utilizes a container of the collapsible type which approximates natural feeding more closely in that the bag 12 tends to collapse as the contents are withdrawn, as shown in Fig. 3, and there is no necessity for making adjustments to control the fit of the nipple so as to be either too tight, thus creating a partial vacuum, or too loose, with resultant leakage around the nipple. All that is required to adjust the rate of flow is to select the size of the opening that is desired in the nipple.

While this invention has been described and is especially well adapted for use in packaging a milk concentrate for use in infant feeding, the invention likewise is adapted for use in the packaging, shipment, storage and feeding of other food concentrates such as fruit juices. Similar neck members which would not be used with a feeding nipple likewise may be used according to this invention for packaging, shipment, storage and dispensing of other food concentrates such as frozen or concentrated fruit ades or fruit juices that are consumed by the general public.

I claim:

1. A package device for use in infant feeding comprising a neck member composed of shape-retaining, strain-resistant material having a smaller end and a larger end, a collapsible bag which closes off and is secured to said larger end of said neck member in collapsed condition, a removable sealing closure secured to said smaller end, a food concentrate confined in sterile condition in said neck member between said collapsed bag and said sealing closure, the mouth of said bag being secured in fluid-tight relation to said larger end of said neck member adjacent the extremity thereof for the reception of liquid added to said concentrate in said neck member into the interior of said bag with accompanying distention of said bag to extended condition, a tube of shape-retaining, strain-resistant material disposed about and adapted to protect said bag when said bag is extended, and coacting attaching elements presented by said larger end of said neck and an end of said tube by which said tube disposed as aforesaid is attached at said end to said larger end of said neck and which permits ready detachment of said tube from and reattachment of said tube to said larger end, said smaller end being adapted for attachment of an infant feeding nipple thereto upon removal of said removable closure.

2. A package device according to claim 1 which comprises attaching elements presented by said smaller end whereby a nipple holder may be attached to said smaller end in liquid-tight relation thereto.

3. A package device for a food concentrate comprising a neck member composed of shape-retaining, strain-resisting material having a smaller end and a larger end, a collapsed bag which is secured to said larger end and closes it off in adjacent relation thereto, a sealing closure secured to and closing off said smaller ends, a food concentrate confined in sealed-in condition within said neck member between said sealing closure and said collapsed bag, said sealing closure being readily removable for introduction of a liquid into said neck member for diluting said food concentrate, the mouth of said bag being secured in fluid-tight relation to said larger end of said neck member for reception into said bag of liquid so introduced into said neck member, and said bag being extendable from said collapsed condition to accommodate liquid so introduced.

4. A package device according to claim 3 wherein said larger end of said neck member presents attaching elements adapted to coact with attaching elements presented by a protector tube of approximately the terminal dimension as said larger end and adapted when attached to said larger end to protect said bag when in extended condition.

5. A package device according to claim 3 wherein said smaller end is adapted for the attachment of an infant feeding nipple thereto.

References Cited in the file of this patent

UNITED STATES PATENTS

| | | |
|---|---|---|
| 2,286,797 | Duerme | June 16, 1942 |
| 2,550,034 | Allen | Apr. 24, 1951 |
| 2,697,531 | Hood | Dec. 21, 1954 |